(12) United States Patent
Chen et al.

(10) Patent No.: US 11,246,313 B2
(45) Date of Patent: Feb. 15, 2022

(54) SYNERGIST FOR IMPROVING CROP STRESS RESISTANCE AND FERTILIZER ABSORPTION CAPACITY

(71) Applicant: SICHUAN HUI TAI AGRICULTURAL TECHNOLOGY CO. LTD., Chengdu (CN)

(72) Inventors: Lezhang Chen, Chengdu (CN); Junbo Yang, Chengdu (CN)

(73) Assignee: SICHUAN HUI TAI AGRICULTURAL TECHNOLOGY CO. LTD., Chengdu (CN)

( * ) Notice: Subject to any disclaimer, the term of this patent is extended or adjusted under 35 U.S.C. 154(b) by 180 days.

(21) Appl. No.: 16/699,513

(22) Filed: Nov. 29, 2019

(65) Prior Publication Data

US 2020/0170260 A1  Jun. 4, 2020

(30) Foreign Application Priority Data

Nov. 29, 2018  (CN) .......................... 201811446415.6

(51) Int. Cl.
| | |
|---|---|
| *A01N 63/10* | (2020.01) |
| *A01N 65/26* | (2009.01) |
| *C05G 5/12* | (2020.01) |
| *C05G 3/60* | (2020.01) |
| *A01N 25/12* | (2006.01) |
| *A01N 59/06* | (2006.01) |
| *A01N 59/16* | (2006.01) |
| *A01N 63/00* | (2020.01) |

(52) U.S. Cl.
CPC ............. *A01N 65/26* (2013.01); *A01N 25/12* (2013.01); *A01N 59/06* (2013.01); *A01N 59/16* (2013.01); *A01N 63/00* (2013.01); *C05G 3/60* (2020.02); *C05G 5/12* (2020.02)

(58) Field of Classification Search
CPC ........ A01N 63/00; A01N 63/10; A01N 65/00; A01N 65/26; A01N 25/12; C05D 9/00; C05D 9/02

See application file for complete search history.

(56) References Cited

FOREIGN PATENT DOCUMENTS

| | | | |
|---|---|---|---|
| CN | 104877689 A | | 9/2015 |
| CN | 105272552 A | | 1/2016 |
| CN | 105859457 | * | 8/2016 |
| CN | 106818876 A | | 6/2017 |
| CN | 107337517 | * | 11/2017 |
| CN | 107793256 A | | 3/2018 |
| KR | 2009050643 | * | 5/2009 |

OTHER PUBLICATIONS

Yu et al. (Culturable Heavy Metal-Resistant and Plant Growth Promoting Bacteria in V-Ti Magnetite Mine Tailing Soil from Panzhihua, China: PLoS ONE 9(9)) (Year: 2012).*

* cited by examiner

*Primary Examiner* — Johann R Richter
*Assistant Examiner* — Danielle Sullivan
(74) *Attorney, Agent, or Firm* — SZDC Law P.C.

(57) ABSTRACT

The invention discloses a synergist for improving crop resistance and fertilizer absorption capacity. The synergist includes the following components by weight: 20-30 parts of an oyster shell powder, 20-30 parts of a water chestnut skin powder, 10-20 parts of a chinaberry bark powder, 10-20 parts of a magnetic material, 10-20 parts of an illite powder, 5-10 parts of a shiitake mushroom polysaccharide extract. The synergist can, on one hand, improve the resistance of crops, especially reducing the pests and diseases significantly, improving waterlogging and drought resistance; and, on the other hand, greatly reduce the use of fertilizers, especially nitrogen fertilizers, preventing soil compaction. It can also significantly increase the content of active polysaccharides, especially β-glucan in crops. In addition, the raw materials are readily available, the cost is low, and there are significant economic benefits.

2 Claims, No Drawings

SYNERGIST FOR IMPROVING CROP STRESS RESISTANCE AND FERTILIZER ABSORPTION CAPACITY

This application claims priority to Chinese Patent Application No.: 201811446415.6, filed on Nov. 29, 2018, which is incorporated by reference for all purposes as if fully set forth herein.

FIELD OF THE INVENTION

The invention relates to the technical field of crop production regulators, in particular, a synergist for improving crop stress resistance and fertilizer absorption capacity.

BACKGROUND OF THE INVENTION

In the process of planting crops, the requirements for crops include strong stress resistance, high yield, high crop quality, low cost, such as less fertilizer use, good soil reproducibility, and so on.

For the above requirements, first, in order to increase yield, a large number of fertilizers, especially nitrogen fertilizers, are often required. Phosphate fertilizers and potassium fertilizers and organic farmhouse fertilizer raw materials are used less and less, which causes the organic matter in the soil to decrease and causes soil compaction. The absorption and utilization of fertilizers, especially nitrogen fertilizers, has also been greatly reduced, resulting in the need to apply more fertilizers.

In addition, the stress resistance of crops generally refers to certain characteristics of crops that are resistant to adverse environments, such as cold resistance, drought resistance, salt resistance, resistance to pests and diseases, etc., which is the function of the crops' immune system.

Moreover, with regard to the quality of crops, with the increasing awareness of health living, the demand for crops with health care and medical functions becomes higher and higher, for example, selenium-rich foods and foods rich in active polysaccharides are often required.

For the above requirements, some research and applications have been done in the field. For example, Chinese patent application publication no. CN 105272552 A discloses a fertilizer synergist for improving nitrogen absorption, which uses more than ten ingredients, such as buckwheat husk, ascorbic acid, molasses, and earthworms, and complex fermentation processes. The composition of this patent is relatively complicated, the preparation method is also complicated, the raw materials are not easy to obtain, and the cost is high.

Another example is Chinese patent application publication no. CN107793256A, which discloses a seaweed fertilizer with anti-stress effect. The fertilizer uses seaweed residue, cassava residue, earthworm dung, etc. as raw materials. Another example, Chinese patent application publication no. CN108329923A discloses a soil conditioning agent for enhancing stress resistance, which is composed of fulvic acid, polyacrylamide, polyacryl alcohol, etc.

Chinese patent application publication no. CN106818876A discloses a plant growth regulator made of wood vinegar solution, chitosan, etc. The regulator can enhance stress resistance and make agricultural crops rich in active polysaccharides. It can also improve the functions of various antibodies and immune systems in crops: resistance to diseases and insect pests, waterlogging resistance, high temperature resistance, cold resistance, drought resistance, and oxidation resistance.

SUMMARY OF THE INVENTION

The goal of the present invention is to provide a new crop synergist that solves the problems of poor resistance, low fertilizer absorption and utilization, and further improves crops quality.

In order to achieve the above objectives, the present application provides a synergist for improving crop stress resistance and fertilizer absorption capacity, comprising the following components by weight: 20-30 parts of an oyster shell powder, 20-30 parts of a water chestnut skin powder, 10-20 parts of a chinaberry bark powder, 10-20 parts of a magnetic material, 10-20 parts of an illite powder, and 5-10 parts of a shiitake mushroom polysaccharide extract.

The oyster shell powder of the present invention is the powder of the shell of oyster, a common shellfish. Research shows that the oyster shell powder contains a large amount of calcium carbonate, and also contains essential trace elements for animals, e.g., copper, magnesium, potassium, molybdenum, phosphorus, manganese, iron, zinc. In addition, the pearl powder layer of oyster shells also contains a variety of amino acid components, so oyster shell powders are used in the field of medical care. The oyster shell powder can also be used for soil improvement. The inventors have conducted a large number of experiments and found that an appropriate amount of oyster shell powder combined with the water chestnut skin powder, the chinaberry bark powder, the magnetic material, the illite powder, and the shiitake mushroom polysaccharide extract can, in one hand, improve crop stress resistance. Compared with the case where no oyster shell powder is added, the use of pesticides can be reduced by more than 10% under the same conditions after adding oyster shell powder, which greatly enhances the crop's resistance to pests and diseases. On the other hand, the absorption and utilization rate of fertilizer is also improved. Compared with the case without adding oyster shell powder, the amount of nitrogen fertilizer can be reduced by 15% after adding oyster shell powder under the same conditions. As a result, the use of nitrogen fertilizer has been greatly reduced, which effectively improves soil compaction. In addition, it has also increased the content of active polysaccharides in crops. At present, the use of oyster shells is limited, which results in a large number of oyster shells being discarded. This invention creates new use for oyster shell powder.

The water chestnut skin powder of the present invention refers to a powder prepared from the skin of water chestnut (*Eleocharis dulcis* (*Burm. f.*) Trin. ex Hensch). The skin is dried at room temperature or low temperature, and then pulverized into powder. Water chestnut grows in fertile wetland, its skin includes a variety of biological compositions and organic chemicals, and needs to be peeled before consumption. At present, water chestnut skin is generally discarded. The inventors have conducted a large number of experiments and found that the water chestnut skin powder and the oyster shell powder can undergo various reactions, such as biological fermentation, in moist soil, thereby promoting plant growth, especially improving the absorption and utilization of fertilizers. Compared with the case without adding the water chestnut powder, the amount of nitrogen fertilizer used can be reduced by more than 25% after adding water chestnut powder under the same conditions. In addition, it can also increase nutrients, such as active polysaccharides, in crops.

The chinaberry bark powder of the present invention refers to a powder prepared from the dried bark and root bark of chinaberry (*Melia toosendan* Siebold & Zucc.), a plant belonging to the genus *Ligusticum*, containing toosendanin. Chinaberry bark has been used as insecticides. However, it is generally necessary to extract toosendanin, which has a complicated process and high cost. The inventors have conducted a large number of experiments and found that the pulverized chinaberry bark directly combined with the oyster shell powder etc. can significantly improve crop's disease resistance, insect resistance, waterlogging and drought resistance, and can increase active polysaccharides content.

The magnetic material of the present invention refers to a material capable of responding to a magnetic field in a certain way, especially a ferromagnetic material. Currently, it has been reported that magnetic materials are used to make magnetic fertilizers, etc., and are also used to stimulate the production of nutrition molecules, inducing plants to produce β-glucan. However, the existing magnetic materials generally require rare earth elements and polymers, the cost of raw materials is high, and the production is relatively complicated.

The illite powder of the present invention is a powder of the clay mineral illite. The chemical composition of illite is K<1 $(Al, R^{2+})_2$ $[(Si, Al) Si_3O_{10}]$ $[OH].nH_2O$. Its crystal is mainly monoclinic aqueous layered structure silicate mineral. Research shows that illite has superior chemical and physical properties, such as high-potassium, high-aluminum, low-iron and smooth, bright, delicate, and heat-resistant. Illite can also release negative ions and far infrared rays. Illite is reported to be used for potassium fertilizer, soil improver and so on. In the present invention, the inventors have conducted a large number of experiments and found that the combination of illite powder with oyster shell powder, and the magnetic material, on one hand, can increase the active polysaccharide content of crops, and on the other hand, can effectively reduce pests and diseases. Under the same conditions, the use of pesticides can be reduced by more than 15%. In addition, new application areas have been developed for the illite powder.

The shiitake mushroom extract of the present invention refers to an extract product obtained by using edible shiitake mushroom as raw materials. The shiitake mushroom is preferably dried by natural air-drying. The shiitake mushroom contains a large amount of active shiitake mushroom polysaccharide, and the active ingredient in the shiitake mushroom active polysaccharide is mainly β-glucan. The inventors of the present application inventors have conducted a large number of experiments and found that the shiitake mushroom extract prepared by a suitable method, in combination with the magnetic material, oyster shell powder and illite powder, provides shiitake mushroom polysaccharides as "a primer." The primer is multiplied and amplified in crops through other components, which increases the production and content of multiple active polysaccharides in crops, for example, the content of β-glucan can be increased more than 3 times.

In one preferred embodiment, the magnetic material is a mixture of a permanent ferrite powder and a magnetite powder.

In one preferred embodiment, the magnetite is Panzhihua vanadium-titanium magnetite.

In one preferred embodiment, the synergist includes by weight: 26 parts of the oyster shell powder, 23 parts of the water chestnut skin powder, 16 parts of the chinaberry bark powder, 15 parts of the magnetic material, 12 parts of the illite powder, and 8 parts of the shiitake mushroom polysaccharide extract.

In one preferred embodiment, the method for preparing the shiitake mushroom polysaccharide extract includes: taking a freeze-dried raw material, crushing it to 30 mesh at room temperature, then adding water in an amount of 5-10 times the weight of the raw material, and adding baking soda in an amount of 0.3% of the water, stirring, conducting an ultrasonication extraction for 2-3 hours, filtering to obtain a filtrate, concentrating the filtrate under reduced pressure, and freeze drying to obtain the extract as a powder.

The method of preparing the synergist of the present invention includes: mixing the above components uniformly.

The method of using the synergist of the present invention includes: based the production cycle of different crops, when applying conventional base fertilizer and supplementary fertilizer, adding the synergist in an amount of 15-30% of the conventional fertilizer (such as conventional nitrogen fertilizer, potassium fertilizer, etc.) by weight, mixing evenly before use.

Compared with the existing technology, the present invention, on one hand, has the advantages that the synergist of the present invention can improve the stress resistance of crops, especially greatly reduce pests and diseases, and can improve waterlogging and drought resistance; and on the other hand, can reduce the use of fertilizers, especially nitrogen fertilizers, to prevent soil compaction, and can also significantly increase the content of active polysaccharides, especially β-glucans in crops. In addition, the raw materials for this application are readily available, the cost of raw materials is low, and there are significant economic benefits.

DETAILED DESCRIPTION OF THE ILLUSTRATED EMBODIMENTS

Reference will now be made in detail to embodiments of the present invention.

Example 1

A synergist for improving crop resistance and fertilizer absorption capacity includes the following components by weight: 30 parts of oyster shell powder, 20 parts of water chestnut skin powder, 20 parts of chinaberry bark powder, 10 parts of the magnetic material, 10 parts of the illite powder, and 10 parts of the shiitake mushroom polysaccharide extract.

Among them, the magnetic material is a mixture of a permanent ferrite powder (purchased from Dongyang Hengdian Excellent Magnet Factory) and Panzhihua vanadium-titanium magnetite powder (from the Panzhihua vanadium-titanium magnetite deposit 15 km northeast of Panzhihua City, crushed to 50 mesh). The mass ratio of the permanent ferrite powder to the Panzhihua vanadium-titanium magnetite powder is 15:85.

The shiitake mushroom polysaccharide extract is prepared as follows: taking the freeze-dried raw material, pulverizing it to 30 mesh at room temperature, adding water in an amount of 5-10 times the weight of the raw material, and adding baking soda in an amount of about 0.3% of the water mass, mixing well, conducting an ultrasonication extraction for 2-3 hours, filtering, distilling under reduced pressure, and freeze-drying to obtain the extract as a powder.

The above materials are weighed and mixed uniformly to obtain "Synergist A."

Example 2

A synergist for improving crop resistance and fertilizer absorption capacity includes the following components by weight: 20 parts of oyster shell powder, 30 parts of water chestnut skin powder, 15 parts of chinaberry bark powder, 15 parts of the magnetic material, 15 parts of the illite powder, and 5 parts of the shiitake mushroom polysaccharide extract.

Among them, the magnetic material is a mixture of a permanent ferrite powder (purchased from Dongyang Hengdian Excellent Magnet Factory) and Panzhihua vanadium-titanium magnetite powder (from the Panzhihua vanadium-titanium magnetite deposit 15 km northeast of Panzhihua City, crushed to 50 mesh). The mass ratio of the permanent ferrite powder to the Panzhihua vanadium-titanium magnetite powder is 15:85.

The shiitake mushroom polysaccharide extract is prepared as follows: taking the freeze-dried raw material, pulverizing it to 30 mesh at room temperature, adding water in an amount of 5-10 times the weight of the raw material, and adding baking soda in an amount of about 0.3% of the water mass, mixing well, conducting an ultrasonication extraction for 2-3 hours, filtering, distilling under reduced pressure, and freeze-drying to obtain the extract as a powder.

The above materials are weighed and mixed uniformly to obtain "Synergist B."

Example 3

A synergist for improving crop resistance and fertilizer absorption capacity includes the following components by weight: 26 parts of oyster shell powder, 23 parts of water chestnut skin powder, 16 parts of chinaberry bark powder, 15 parts of the magnetic material, 12 parts of the illite powder, and 8 parts of the shiitake mushroom polysaccharide extract.

Among them, the magnetic material is a mixture of a permanent ferrite powder (purchased from Dongyang Hengdian Excellent Magnet Factory) and Panzhihua vanadium-titanium magnetite powder (from the Panzhihua vanadium-titanium magnetite deposit 15 km northeast of Panzhihua City, crushed to 50 mesh). The mass ratio of the permanent ferrite powder to the Panzhihua vanadium-titanium magnetite powder is 15:85.

The shiitake mushroom polysaccharide extract is prepared as follows: taking the freeze-dried raw material, pulverizing it to 30 mesh at room temperature, adding water in an amount of 5-10 times the weight of the raw material, and adding baking soda in an amount of about 0.3% of the water mass, mixing well, conducting an ultrasonication extraction for 2-3 hours, filtering, distilling under reduced pressure, and freeze-drying to obtain the extract as a powder.

The above materials are weighed and mixed uniformly to obtain "Synergist C."

Example 4

This example is a comparative example. Compared with Example 3, this example does not include oyster shell powder, i.e. the materials include 23 parts of water chestnut skin powder, 16 parts of chinaberry bark powder, 15 parts of magnetic material, 12 parts of illite powder, and 8 parts of the shiitake mushroom polysaccharide extract. The rest is the same as in Example 3. "Comparative Example A" is obtained.

Example 5

This example is a comparative example. Compared with Example 3, this example does not include the water chestnut skin powder, that is, materials include 26 parts of oyster shell powder, 16 parts of chinaberry bark powder, 15 parts of magnetic material, 12 parts of illite powder, and 8 parts of the shiitake mushroom polysaccharide extract. The rest is the same as in Example 3. "Comparative Example B" is obtained.

Example 6

This example is a comparative example. Compared with Example 3, this example does not include chinaberry bark powder, i.e. the materials include 26 parts of oyster shell powder, 23 parts of water chestnut skin powder, 15 parts of magnetic material, 12 parts of illite powder, and 8 parts of the shiitake mushroom polysaccharide extract. The rest is the same as in Example 3. "Comparative Example C" is obtained.

Example 7

This example is a comparative example. Compared with Example 3, this example does not include magnetic material, i.e. the materials include 26 parts of oyster shell powder, 23 parts of water chestnut skin powder, 16 parts of chinaberry bark powder, 12 parts of illite powder, and 8 parts of the shiitake mushroom polysaccharide extract. The rest is the same as in Example 3. "Comparative Example D" is obtained.

Example 8

This example is a comparative example. Compared with Example 3, this example does not include the shiitake mushroom polysaccharide extract, i.e. the materials include 26 parts of oyster shell powder, 23 parts of water chestnut skin powder, 16 parts of chinaberry bark powder, 15 parts of magnetic material, and 12 parts of illite powder. The rest is the same as in Example 3. "Comparative Example E" is obtained.

Example 9

This example is a comparative example. Compared with Example 3, this example does not include illite powder, i.e. the materials include 26 parts of oyster shell powder, 23 parts of water chestnut skin powder, 16 parts of chinaberry bark powder, 15 parts of magnetic material, and 8 parts of the shiitake mushroom polysaccharide extract. The rest is the same as in Example 3. "Comparative Example F" is obtained.

Example 10

In this example, planting rice was used as an example, and a test was performed in a paddy field in Pengzhou, Sichuan. Base fertilizer, tiller fertilizer, and ear fertilizer (including combined fertilizers including nitrogen, phosphorus, potassium etc.) are applied according to conventional methods, respectively. Parallel experiments were carried out on eight paddy fields with an area of about 1 mu each. In seven of the test fields, 15% of "Synergist C," "Comparative Example A," "Comparative Example B," "Comparative Example C," "Comparative Example D," "Comparative Example E," and "Comparative Example F" were added to the fertilizers applied each time. For the remaining paddy field, no regulator was added, proceed as usual, i.e., "Blank example."

TABLE 1

Processing results of each experimental group

| | | Nitrogen fertilizer Amount | Pesticide Cost | Yield (kg) |
|---|---|---|---|---|
| 1 | Synergist C | 11.0 kg | 80 Chinese Yuan | 580 kg |
| 2 | Comparative Example A | 13.5 kg | 90 Chinese Yuan | 565 kg |
| 3 | Comparative Example B | 15.0 kg | 95 Chinese Yuan | 560 kg |
| 4 | Comparative Example C | 15.0 kg | 85 Chinese Yuan | 565 kg |
| 5 | Comparative Example D | 16.0 kg | 100 Chinese Yuan | 560 kg |
| 6 | Comparative Example E | 17.0 kg | 105 Chinese Yuan | 560 kg |
| 7 | Comparative Example F | 16.5 kg | 105 Chinese Yuan | 560 kg |
| 8 | Blank Example | 18.0 kg | 110 Chinese Yuan | 560 kg |

The pesticide type and application time are the same, but the amounts of pesticide used in different fields was different, which is converted into the fertilizer cost in the table.

As shown in table 1, the synergist of the present invention has a significant synergistic effect, significantly reducing the amount of nitrogen fertilizer and pesticide used, and also increasing the production.

After harvesting, the rice was dried, and the β-glucan in the rice was measured. The β-glucan content was measured separately.

The detailed method:
The sample was first pulverized to 35 mesh. 2 g of sample was weighed and placed in a 100 mL centrifuge tube. 10 mL of ethanol-water solution (50%, v/v) was added to the centrifuge tube, and 30 mL of sodium phosphate buffer solution (20 mM, PH 6.5) was then added and shaken well. The centrifuge tube was heated in boiling water for 5 minutes, shaken, and then heated for 3 more minutes and shaken to prevent the formation of gel pieces. After the centrifuge tube was cooled to 40° C., 2 mL of lichenase was added. After enzymolysis at 40° C. for 1 hour, 18 mL of water was added to adjust the volume to 60 mL. Then the mixture was centrifuged at 1000 r/min for 10 min, 1 mL of the supernatant was transferred to a glass test tube, 1 mL of 3-glucanase was added and hydrolyzed at 40° C. for 15 minutes, 3 mL of GOPOD reagent was added and reacted at 40° C. for 20 minutes. The absorbance value was then measured at 510 nm, and converted to a percentage content. The results are shown in Table 2.

TABLE 2

Contents of Total β-Glucan in Rice Obtained by Various Treatment Methods (%)

| Groups | Synergist C | Comparative Example A | Comparative Example B | Comparative Example C | Comparative Example D | Comparative Example E | Comparative Example F | Blank Example |
|---|---|---|---|---|---|---|---|---|
| Contents | 4.16 | 3.13 | 3.36 | 3.55 | 1.39 | 1.05 | 3.16 | 0.38 |

What is claimed is:

1. A synergist for improving crop stress resistance and fertilizer absorption capacity, consisting of the following components by weight:
   20-30 parts of an oyster shell powder,
   20-30 parts of a water chestnut skin powder,
   10-20 parts of a chinaberry bark powder,
   10-20 parts of a magnetic material,
   10-20 parts of an illite powder, and
   5-10 parts of a shiitake mushroom extract,
   wherein the magnetic material is a mixture of a permanent ferrite powder and a magnetite powder, and the magnetite powder is Panzhihua vanadium-titanium magnetite; and
   wherein the shiitake mushroom extract is prepared by the following steps:
     freeze drying a raw material,
     crushing the raw material to 30 mesh at room temperature,
     adding water in an amount of 5-10 times the weight of the raw material,
     adding baking soda in an amount of 0.3% of the water, stirring,
     conducting an ultrasonication extraction for 2-3 hours, filtering to obtain a filtrate,
     concentrating the filtrate under reduced pressure, and freeze drying to obtain the shiitake mushroom extract.

2. A synergist for improving crop stress resistance and fertilizer absorption capacity, consisting of the following components by weight:
   26 parts of the oyster shell powder,
   23 parts of the water chestnut skin powder,
   16 parts of the chinaberry bark powder,
   15 parts of the magnetic material,
   12 parts of the illite powder, and
   8 parts of the shiitake mushroom extract.

* * * * *